United States Patent
Yamamoto et al.

(10) Patent No.: US 7,472,766 B2
(45) Date of Patent: Jan. 6, 2009

(54) REGENERATION CONTROL SYSTEM

(75) Inventors: Kazuhisa Yamamoto, Wako (JP); Hirokatsu Amanuma, Wako (JP); Akihiro Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 247 days.

(21) Appl. No.: 11/265,300

(22) Filed: Nov. 3, 2005

(65) Prior Publication Data
US 2006/0102395 A1 May 18, 2006

(30) Foreign Application Priority Data
Nov. 12, 2004 (JP) ............... 2004-329007

(51) Int. Cl.
*B60K 1/02* (2006.01)
*B60L 7/10* (2006.01)

(52) U.S. Cl. ....................... 180/65.1; 701/70
(58) Field of Classification Search ............... 180/65.1, 180/65.2, 197, 242; 701/70; 903/947
See application file for complete search history.

(56) References Cited

U.S. PATENT DOCUMENTS

| | | | |
|---|---|---|---|
| 5,465,806 A * | 11/1995 | Higasa et al. ............... | 180/165 |
| 5,790,970 A * | 8/1998 | Brachert et al. ............. | 701/70 |
| 6,033,041 A * | 3/2000 | Koga et al. .................. | 303/152 |
| 6,119,799 A * | 9/2000 | Morisawa et al. .......... | 180/65.2 |
| 6,484,833 B1 * | 11/2002 | Chhaya et al. ............. | 180/65.4 |
| 6,930,405 B2 * | 8/2005 | Gunji ........................ | 290/40 C |
| 6,988,779 B2 * | 1/2006 | Amanuma et al. .......... | 303/152 |
| 7,216,943 B2 * | 5/2007 | Nishikawa et al. .......... | 303/152 |
| 2003/0162631 A1 * | 8/2003 | Williams ................... | 477/5 |
| 2004/0069548 A1 * | 4/2004 | Kira et al. ................. | 180/65.3 |
| 2004/0147366 A1 * | 7/2004 | Aoki et al. ................. | 477/6 |

FOREIGN PATENT DOCUMENTS

JP 2003-63265 3/2003

\* cited by examiner

*Primary Examiner*—Frank B Vanaman
(74) *Attorney, Agent, or Firm*—Westerman, Hattori, Daniels & Adrian, LLP.

(57) ABSTRACT

A regeneration control system which permits highly efficient regeneration while a vehicle is traveling stably, and also permits regeneration to be performed without interfering with a smooth behavior correction made by a driver when the behavior of the vehicle has been disturbed. The regeneration control system includes a total regeneration amount determiner for determining the total regeneration amount of a first electric motor connected to front wheels and a second electric motor connected to rear wheels, a regeneration amount allocation determiner for determining regeneration amount allocation to each electric motor, a determination value calculator for calculating a determination value based on a steering angle and a yaw rate, and a determiner for determining whether a determination value lies within a predetermined range.

4 Claims, 9 Drawing Sheets

REAR WHEEL REGENERATION ALLOCATION RATIO MAP

TABLE OF CORRECTION COEFFICIENT BASED ON GRADIENT

TABLE OF CORRECTION COEFFICIENT BASED ON YAW RATE

TABLE OF YAW RATE/STEERING ANGLE UPPER LIMIT

REGENERATION CONTROL SYSTEM

BACKGROUND OF THE INVENTION

1. Field of the Invention

The present invention relates to a regeneration control system adapted to control regeneration at deceleration of a generator motor provided in an electric car or a hybrid car.

2. Description of the Related Art

Hitherto, as an automobile equipped with this type of a regeneration control system, there has been known a hybrid vehicle in which one of the pairs of front wheels and rear wheels is connected to an engine, while the other is connected to an electric motor, as disclosed in Japanese Unexamined Patent Application Publication No. 2003-63265. In this type of automobile, the electric motor acts as a generator to perform regeneration during a decelerated travel so as to recover traveling energy in the form of electric energy and to store the recovered electric energy in a battery. Except for a decelerated drive mode, the electric motor is driven as necessary by the electric energy stored in the battery.

In this type of automobile, a vehicular behavior during its turn is stabilized by controlling regenerative braking torque on the right wheel and the left wheel, separately, that are driven by the electric motor on the basis of information, such as a steering angle or a yaw rate, while the vehicle is turning.

In recent years, there has been proposed a four-wheel-drive vehicle adapted to perform drive and regeneration of front wheels by a first electric motor connected to the front wheels and to perform drive and regeneration of rear wheels by a second electric motor connected to the rear wheels. In this type of four-wheel-drive vehicle, detailed regeneration control is conducted by allocating a regeneration amount to the front and rear wheels on the basis of vehicular speed and/or the steering angle of a steering wheel, thereby obtaining high energy efficiency.

Even if efforts are made to stabilize the behavior of the vehicle while turning by carrying out the conventional regeneration control as described above, the behavior of the vehicle may be unexpectedly disturbed due to an influence, such as a disturbance. If the behavior of the vehicle is disturbed, then a driver tries to correct the behavior of the vehicle by performing an operation, such as "counter-steering," in which the driving wheel is steered in the opposite direction from a turning direction.

However, when the driver is performing the operation for correcting the vehicular behavior, the steering angle and the yaw rate considerably change. Further, when detailed regeneration control is carried out in response to the changes in the steering angle and the yaw rate under such a condition in the four-wheel-drive vehicle, the allocation of the regenerative braking to the front and rear wheels also considerably changes as the steering angle and the yaw rate change. This may make it difficult for the driver to perform an operation based on the braking forces of the front and rear wheels that significantly change and may prevent smooth correction of the vehicular behavior.

SUMMARY OF THE INVENTION

Accordingly, it is an object of the present invention to provide a regeneration control system that solves the problem described above, and that is capable of performing highly efficient regeneration while a vehicle is stably traveling and performing regeneration without preventing smooth behavior correction by a driver when the behavior of the vehicle is disturbed.

To this end, according to the present invention, there is provided a regeneration control system of an automobile, which is provided with a first electric motor connected to front wheels and a second electric motor connected to rear wheels so as to carry out regeneration by the first and the second electric motors during deceleration, a total regeneration amount determiner for determining a total regeneration amount of a vehicle on the basis of a running condition of the vehicle for each predetermined time, a regeneration amount allocation determiner for determining the allocation of a regeneration amount to each of the first and the second electric motors relative to a total regeneration amount on the basis of a vehicle speed and the steering angle of a steering wheel when the total regeneration amount has been determined by the total regeneration amount determiner, a determination value calculator for calculating a determination value for determining a behavior of the vehicle on the basis of the steering angle of the steering wheel and a yaw rate when the allocation of the regeneration amount has been determined by the regeneration amount allocation determiner, a determiner for determining whether the determination value calculated by the determination value calculator lies in a predetermined range defined beforehand, a selector for selecting, if the determiner determines that the determination value lies in the predetermined range, the allocation of a regeneration amount determined by the regeneration amount allocation determiner at that point, or for selecting, if it is determined that the determination value lies out of the predetermined range, the allocation of a regeneration amount determined by the regeneration amount allocation determiner at the point when the determination value lied in the predetermined immediately before it deviated from the predetermined range, and a regeneration command issuer for sending a regeneration amount command to each of the first and the second electric motors on the basis of the regeneration amount allocation selected by the selector.

The regeneration control system in accordance with the present invention carries out regeneration control for every predetermined time (e.g., 10 msec) during deceleration of a vehicle, the control being conducted such that appropriate regeneration amounts are obtained for the first electric motor and the second electric motor, respectively, according to the traveling condition of the vehicle at that point. More specifically, the total regeneration amount of the vehicle is first determined by the total regeneration amount determiner. Then, the regeneration amount allocation determiner determines the allocation of the regeneration amount to the first electric motor and the regeneration amount to the second electric motor relative to the total regeneration amount. At this time, the regeneration amount allocation determiner determines the allocation ratio of the regeneration amount on the basis of a vehicle speed and the steering angle of the steering wheel.

If the behavior of the vehicle is stable, then the regeneration command issuer sends regeneration amount commands to the first and the second electric motors, respectively, on the basis of the allocation of the regeneration amounts determined by the regeneration amount allocation determiner. On the other hand, if the behavior of the vehicle is disturbed, then the regeneration command issuer sends regeneration amount commands to the first and the second electric motors, respectively, on the basis of the allocation of the regeneration amounts determined by the regeneration amount allocation determiner immediately before the behavior of the vehicle was disturbed. Whether the behavior of the vehicle is stable or not is determined by the determiner, and the selector selects an allocation ratio of the regeneration amounts to be adopted by the regeneration command issuer according to a determination result provided by the determiner. More specifically, when the regeneration amount allocation determiner decides the allocation of regeneration amounts, the determination value calculator calculates a determination value on the basis of the steering angle of the steering wheel and a yaw rate. Then, the determiner determines whether the calculated determination value lies within a predetermined range, which is defined beforehand. The determination value, which indicates the behavior of the vehicle, can be determined from, for example, yaw rate/steering angle. As the predetermined range, for example, the range of yaw rate/steering angle in which the behavior of the vehicle is stabilized relative to a vehicle speed may be adopted. When the yaw rate/steering angle is used as the determination value, the value of the yaw rate/steering angle at that vehicle speed lies within a predetermined range while the behavior of the vehicle is stable, whereas the value of the yaw rate/steering angle at that vehicle speed will deviate from the predetermined range if the behavior of the vehicle is disturbed and the driver carries out counter-steering operation.

When the determiner determines that the determination value lies within the predetermined range, it means that the behavior of the vehicle is stable; therefore, the selector selects the regeneration amount allocation determined by the regeneration amount allocation determiner at that point. If the regeneration amount allocation determined by the regeneration amount allocation determiner at that point is adopted when the determiner has determined that the determination value is outside the predetermined range, then the regeneration amount of the first electric motor and the regeneration amount of the second electric motor are changed and the front and rear regenerative braking torques are accordingly changed even when the driver is performing the counter-steering operation to correct a disturbed behavior of the vehicle. This may cause the driver to be confused. According to the present invention, therefore, if a determination value is outside a predetermined range, the selector selects regeneration amount allocation decided by the regeneration amount allocation determiner when the determination value was still within the predetermined range and immediately before the determination value gets out of the predetermined range. With this arrangement, the regeneration amount allocation is fixed to the one obtained immediately before the behavior of the vehicle was disturbed to maintain the regenerative braking torques of the two electric motors at constant levels while the driver is carrying out the counter-steering operation to correct a disturbed behavior of the vehicle, thus enabling the driver to smoothly correct the vehicular behavior without confusion.

As described above, according to the present invention, the provision of the determiner and the selector make it possible to grasp the behavior of a vehicle, and regeneration can be accomplished without interfering with an operation of a driver while the driver is trying to correct the behavior of the vehicle.

In the present invention, the regeneration amount allocation determiner preferably includes a corrector for correcting regeneration amount allocation according to a gradient of a traveling road. This arrangement makes it possible to obtain regeneration amount allocation for front and rear wheels on the basis of load allocation at the front and rear sides of a vehicle during deceleration when a traveling road has a falling gradient or a rising gradient, thus permitting improved accuracy of regeneration amount allocation determined by the regeneration amount allocation determiner.

Further, in the present invention, the regeneration amount allocation determiner preferably includes a corrector for correcting regeneration amount allocation on the basis of a yaw rate. This arrangement makes it possible to obtain the regeneration amount allocation for the front and rear wheels on the basis of load allocation of the vehicle during a turn, permitting improved accuracy of regeneration amount allocation determined by the regeneration amount allocation determiner.

Further, in the present invention, the regeneration command issuer preferably includes a restrainer for restraining a regeneration amount to be specified at the present moment on the basis of a change in the regeneration amount to be specified at the present moment relative to the regeneration amount specified immediately before. In the regeneration control system, as described above, the allocation of a regeneration amount determined at that moment is adopted while the behavior of the vehicle is stable, and if the behavior of the vehicle is disturbed, then the allocation of regeneration amount is fixed to the one obtained immediately before the behavior of the vehicle was disturbed. If, for example, the behavior of the vehicle is disturbed and then stabilized, the fixed allocation of regeneration amount is switched to the allocation of regeneration amount at the moment when the allocation was stabilized. This possibly leads to an increased change in regenerative braking torque. Hence, the restrainer restrains a change in regeneration amount so as to suppress a sudden change in regenerative braking, thus permitting stable travel to be achieved.

DESCRIPTION OF THE PREFERRED EMBODIMENTS

An embodiment of the present invention will be explained in conjunction with the accompanying drawings.

Figure 1:
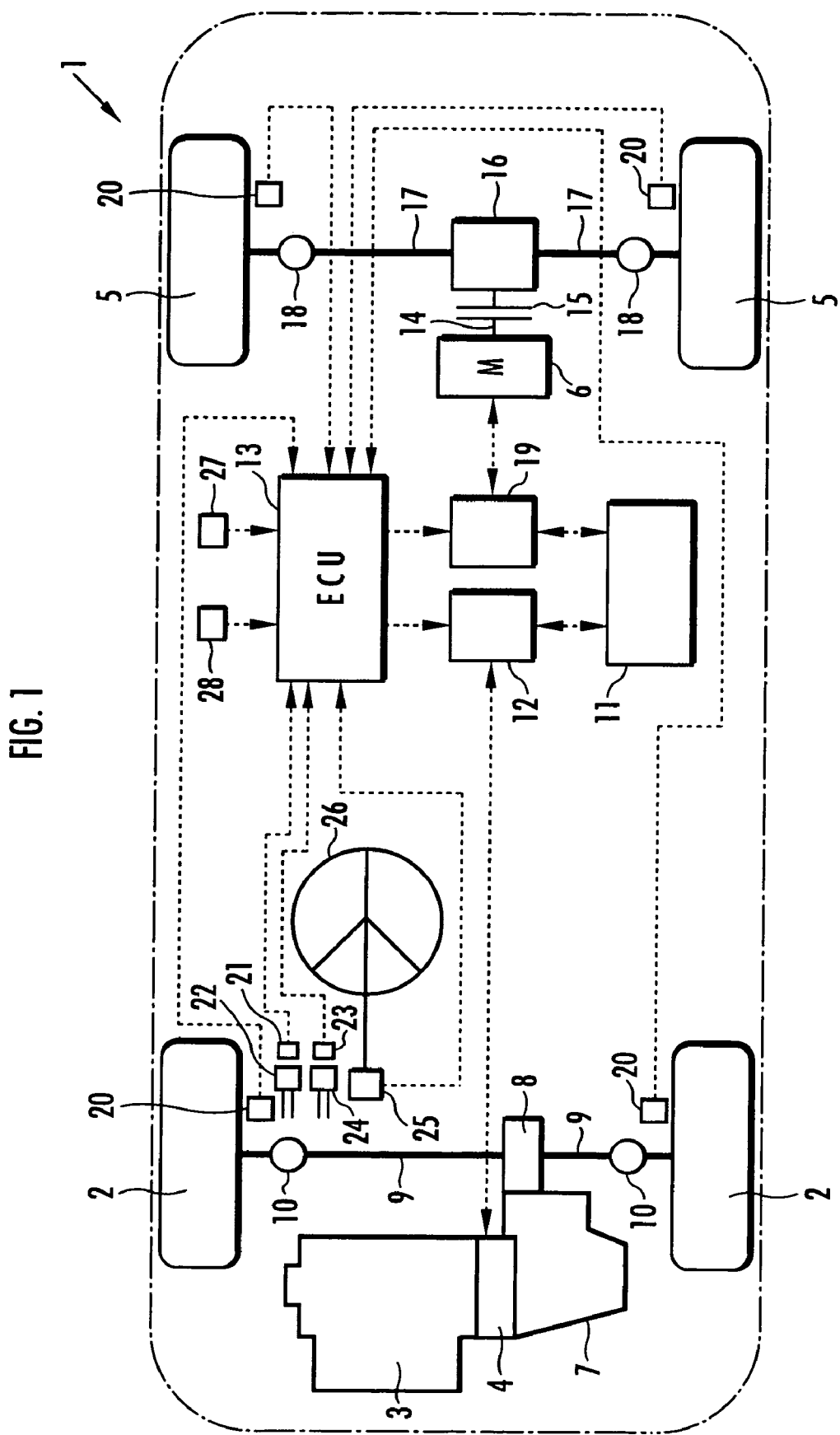
FIG. 1 is a schematic construction diagram of a vehicle provided with a regeneration control system according to an embodiment of the present invention.

Referring to FIG. 1, a vehicle 1 is a hybrid vehicle. An engine 3 and a first electric motor 4 are connected to front wheels 2, while a second electric motor 6 is connected to rear wheels 5.

The engine 3 is installed at front of the vehicle 1 and connected to the front wheels 2 through the intermediary of a transmission 7, a front differential 8, front axles 9, constant velocity joints 10, and the like. The first electric motor 4 located between the engine 3 and the transmission 7 is connected to the front wheels 2 through the same path as that of the engine 3 via a rotary shaft (not shown) of the engine 3.

The first electric motor 4 is driven by a battery 11 to generate an auxiliary driving force that supplements the driving force of the engine 3. When a driving force is transmitted from the front wheels 2 to the first electric motor 4 at deceleration of the vehicle 1, the first electric motor 4 acts as a generator to produce a regenerative braking force, and recovers the kinetic energy of the vehicle 1 as electric energy into the battery 11. A first power drive unit (PDU) 12 is provided between the first electric motor 4 and the battery 11. The first PDU 12 equipped with an inverter constructed by, for example, bridge-connecting a switching device composed of a plurality of transistors, controls the driving and regenerating operations of the first electric motor 4 in response to control commands received from an electronic control unit (ECU) 13.

The second electric motor 6 has its output shaft 14 connected to the rear wheels 5 through the intermediary of a clutch 15, a rear differential 16, rear axles 17, constant velocity joints 18, and the like. The second electric motor 6 is driven by the battery 11. When the clutch 15 is engaged to cause the second electric motor 6 to drive the rear wheels 5, the vehicle 1 is driven by the four wheels. The clutch 15 enables the rear axles 17 and the second electric motor 6 to be disengaged from each other when, for example, drive or regeneration by the second electric motor 6 is unnecessary.

Further, when a driving force is transmitted from the rear wheels 5 to the second electric motor 6 at deceleration of the vehicle 1, the second electric motor 6 acts as a generator to produce a regenerative braking force, and recovers the kinetic energy of the vehicle body as electric energy into the battery 11. A second PDU 19 that controls the drive and regeneration operations of the second electric motor 6, as the first PDU 12 does, is provided between the second electric motor 6 and the battery 11.

Further, the front wheels 2 and the rear wheels 5 are provided with wheel revolution speed sensors 20, detection signals from all the wheel revolution speed sensors 20 being output to an ECU 13. The ECU 13 calculates vehicle speed on the basis of the received detection signals.

The ECU 13 receives a detection signal indicating the opening of an accelerator 22, including ON and OFF, from an accelerator opening degree sensor 21, a detection signal indicating a depressing force applied to a brake 24 output from a brake depressing force sensor 23, and a detection signal indicating the steering angle of a steering wheel 26 output from a steering angle sensor 25. The ECU 13 further receives a detection signal from a yaw rate sensor 27 and a detecting signal indicating the gradient of a traveling road output from a gradient sensor 28.

Figure 2:
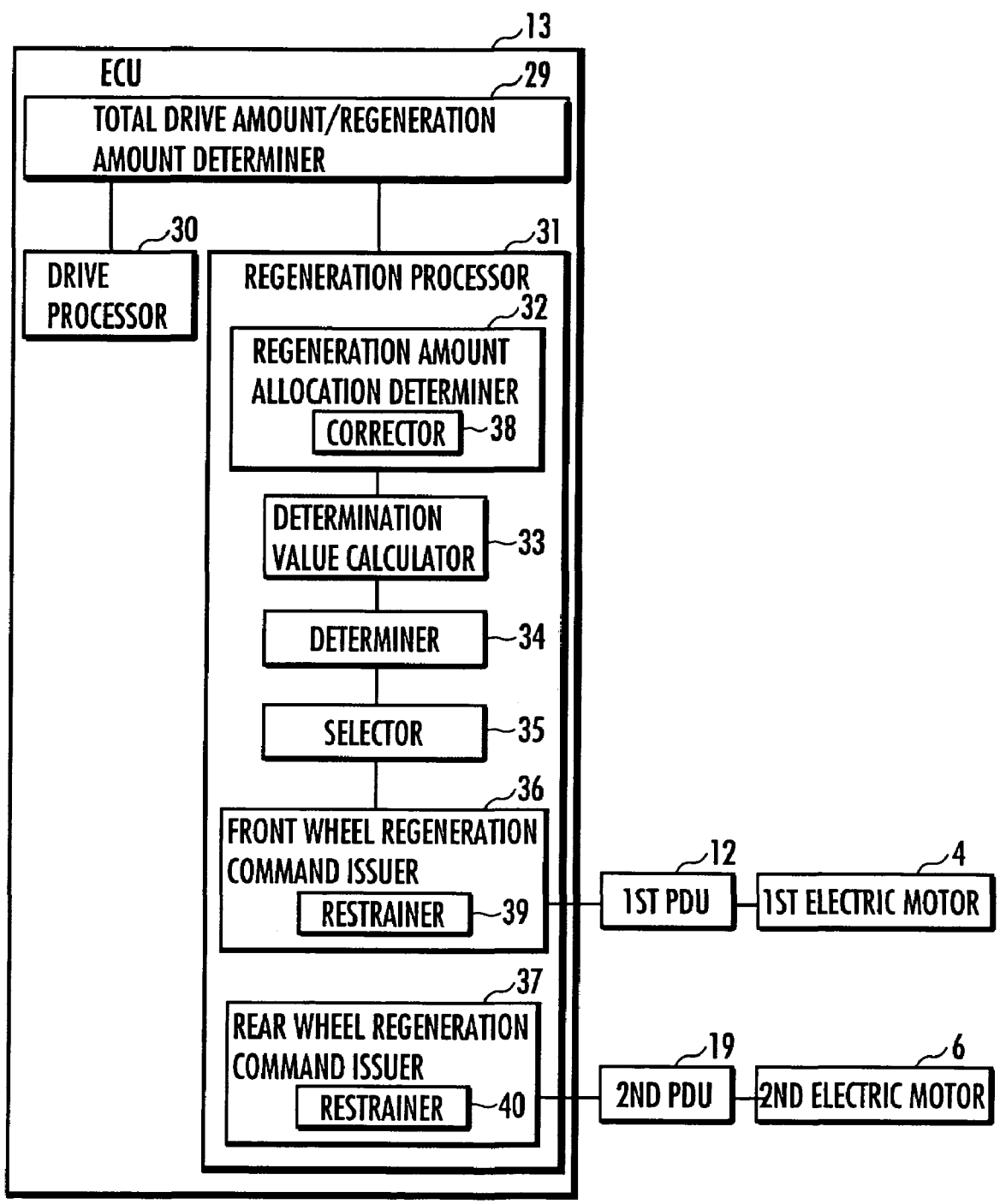
FIG. 2 is a block diagram schematically showing an essential section of an ECU.

Referring to FIG. 2, the ECU 13 is provided with a total drive amount/regeneration amount determiner 29 (the total regeneration amount determining means in the present invention) that determines a total drive amount or a total regeneration amount necessary for the vehicle 1 to run, a drive processor 30 that determines the allocation of driving forces to front and rear, namely, the front wheels 2 and the rear wheels 5, when the vehicle 1 is in a drive mode and issues output commands to the engine 3, the first electric motor 4 and the second electric motor 6, and a regeneration processor 31 that determines the allocation of regeneration amounts to front and rear, namely, the front wheels 2 and the rear wheels 5, when the vehicle 1 slows down, and issues commands of regeneration amounts to the first electric motor 4 and the second electric motor 6.

As shown in FIG. 2, the regeneration processor 31 includes a regeneration amount allocation determiner 32, a determination value calculator 33, a determiner 34, a selector 35, a front wheel regeneration command issuer 36, and a rear wheel regeneration command issuer 37. Further, the regeneration amount allocation determiner 32 has a corrector 38. The front wheel regeneration command issuer 36 and the rear wheel regeneration command issuer 37 have restrainers 39 and 40, respectively.

Referring now to the flowcharts of FIG. 3 to FIG. 7, the regeneration processing of the ECU 13 acting as the regeneration control system according to the present invention will be explained. This processing is executed for every predetermined time (e.g., 10 msec).

Figure 3:
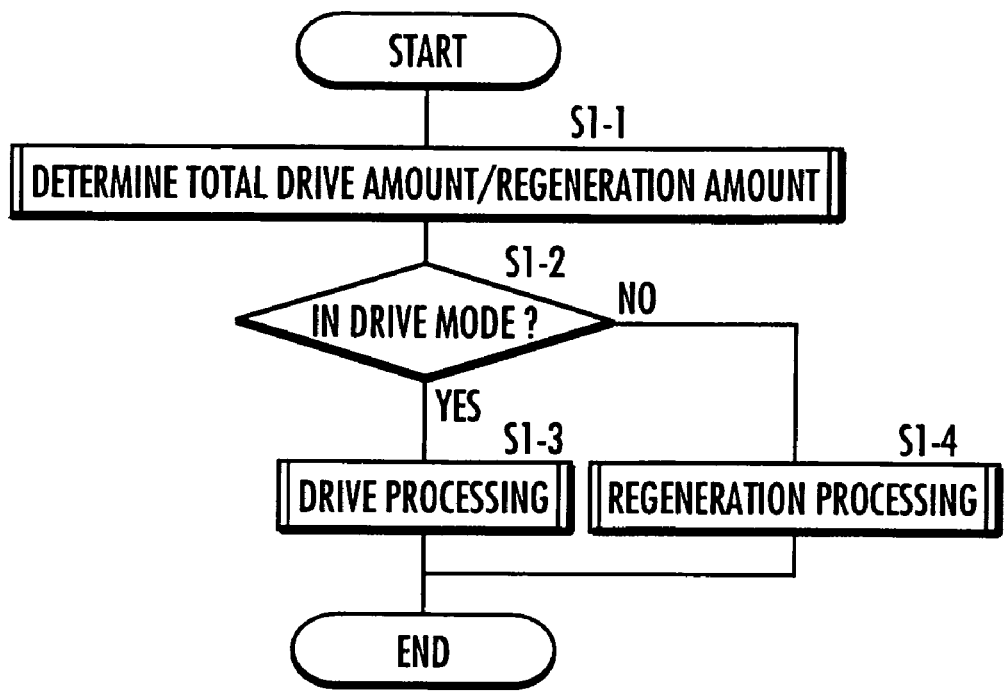
FIG. 3 is a flowchart showing electric motor control.

Referring first to FIG. 3, in step S1-1, the total drive amount/regeneration amount determiner 29 determines the total drive amount/regeneration amount necessary for a vehicle to travel on the basis of the vehicle speed calculated on the basis of a detection signal of the wheel revolution speed sensor 20 and the opening of the accelerator 22 detected by the accelerator opening sensor 21.

Subsequently, the processing determines in step S1-2 whether the vehicle 1 is in a drive mode or a deceleration mode, and if it is in the drive mode, then the processing proceeds to step S1-3, or if it is in the deceleration mode, then the processing proceeds to step S1-4. In step S1-3, the drive processor 30 performs the drive processing, that is, the drive processor 30 determines the drive amount allocation to the front wheels 2 and the rear wheels 5, and specifies outputs of the engine 3, the first electric motor 4, and the second electric motor 6 on the basis of the determined allocation. Meanwhile, in step S1-4, regeneration processing (to be discussed later) is carried out by the regeneration processor 31 to control the regeneration by the first electric motor 4 and the second electric motor 6.

Figure 4:
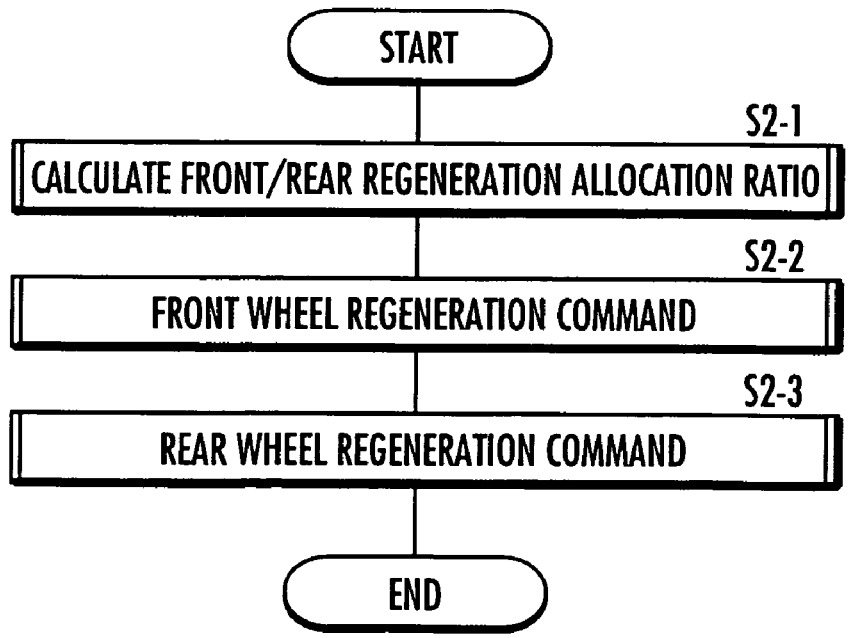
FIG. 4 is a flowchart showing regeneration processing.

The regeneration processing will be further explained. Referring to FIG. 4, first, the regeneration amount allocation ratio of the front wheels 2 to the rear wheels 5 is calculated in step S2-1. Then, in step S2-2, the regeneration amount of the front wheels 2 is calculated on the basis of the calculated regeneration amount allocation ratio, and the command of the calculated regeneration amount is issued to the first electric motor 4. Subsequently, in step S2-3, the regeneration amount for the rear wheels 5 is calculated on the basis of the calculated regeneration amount allocation ratio, and the command of the calculated regeneration amount is issued to the second electric motor 6.

Figure 5:
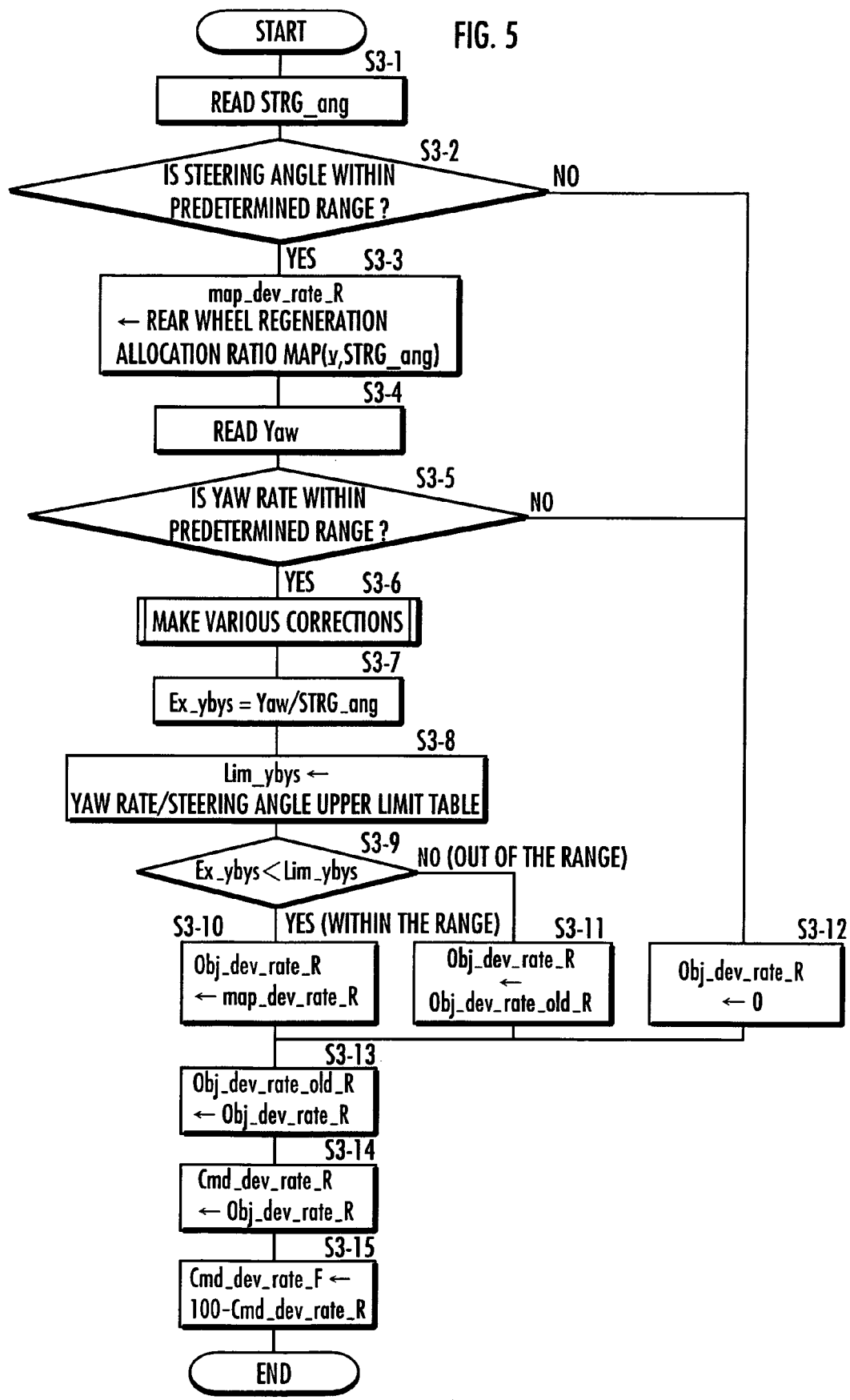
FIG. 5 is a flowchart showing a method for calculating allocation ratio of front and rear regeneration amounts.
Figure 6:
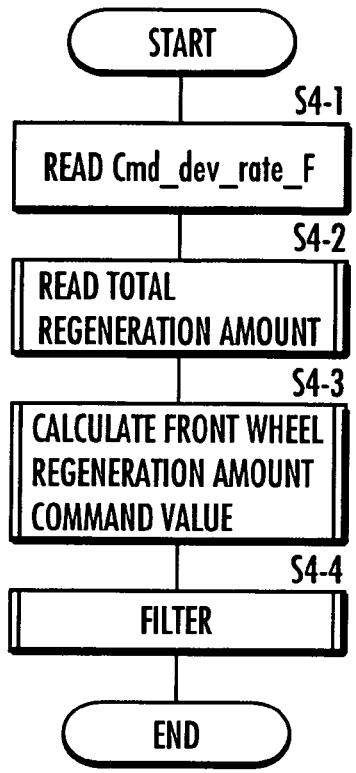
FIG. 6 is a flowchart showing the processing of sending a front wheel regeneration amount command to a first electric motor.

To explain the above in further detail, in step S2-1 shown in FIG. 4, the regeneration amount allocation ratio of the front wheels 2 to the rear wheels 5 is calculated according to the procedure shown in FIG. 5. More specifically, referring to FIG. 5, the processing first reads in step S3-1 a steering angle STRG_ang of the steering wheel 26 detected by the steering angle sensor 25, and proceeds to step S3-2. In step S3-2, the processing determines whether the absolute value of the read steering angle STRG_ang lies within a predetermined range defined beforehand, and if it lies within the predetermined range, then the processing determines that the behavior is normal and proceeds to step S3-3, or if it is out of the predetermined range, then the processing determines that the behavior is abnormal and proceeds to step S3-12. In the case where the processing proceeds to step S3-12, the regeneration allocation ratio of the rear wheels 5 will be set to zero, as it will be discussed hereinafter.

Figure 8:
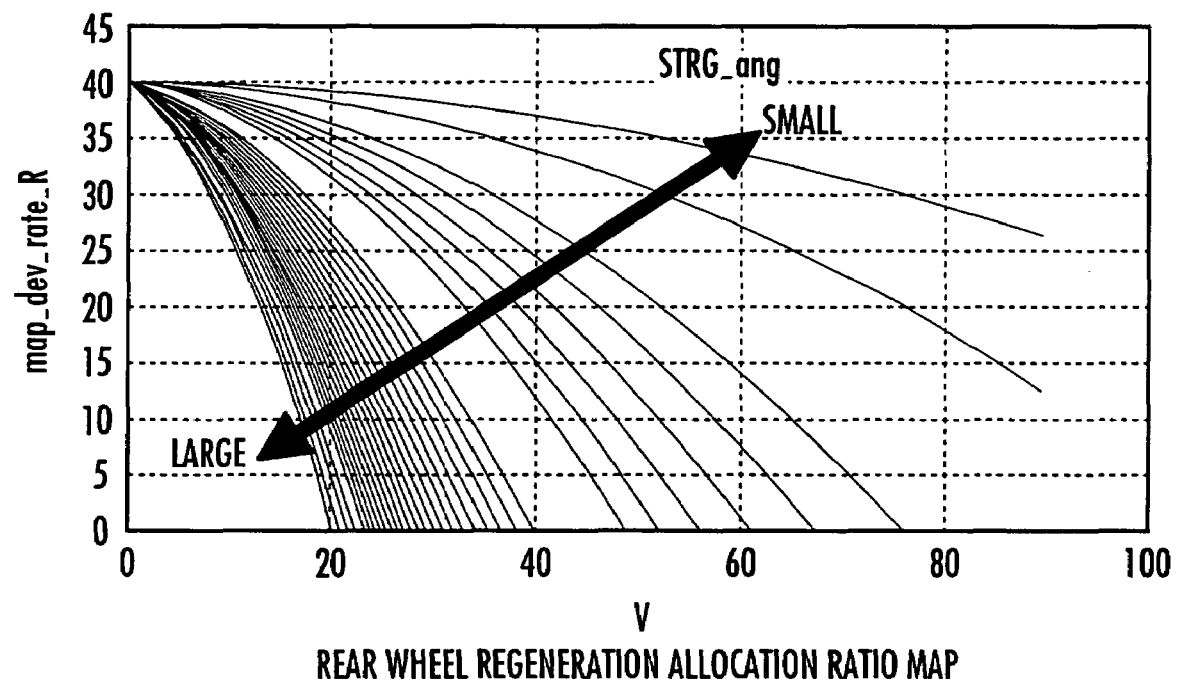
FIG. 8 is a diagram showing a rear wheel regeneration amount allocation ratio map.

In step S3-3, the regeneration amount allocation determiner 32 searches the rear wheel regeneration amount allocation ratio map of FIG. 8 on the basis of vehicle speed v and the steering angle STRG_ang and reads a regeneration allocation ratio map_dev_rate_R of the rear wheels 5.

The processing then proceeds to step S3-4 to read a yaw rate Yaw detected by the yaw rate sensor 27, and proceeds to step S3-5. In step S3-5, the processing determines whether the absolute value of the read yaw rate Yaw is within a predetermined range fixed beforehand, and if it lies within the predetermined range, then the processing determines that the behavior is normal and proceeds to step S3-6, or if it is out of the predetermined range, then the processing determines that the behavior is abnormal and proceeds to step S3-12. In the case where the processing proceeds to step S3-12, the regeneration allocation ratio of the rear wheels 5 will be set to zero, as it will be discussed hereinafter.

Figure 9:
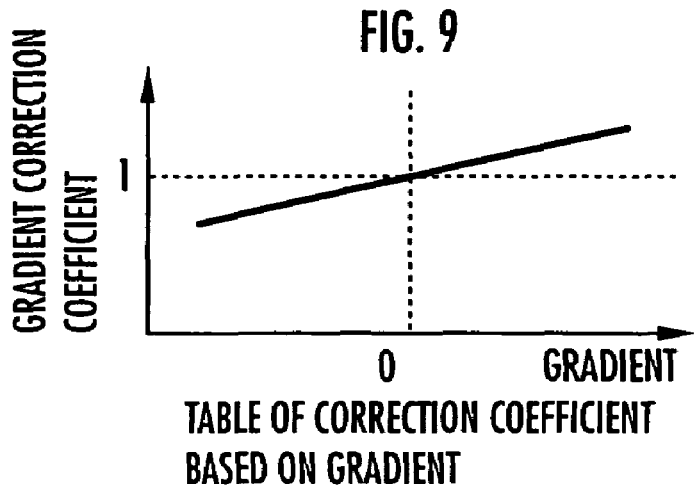
FIG. 9 is a table showing correction coefficients based on gradient.
Figure 10:
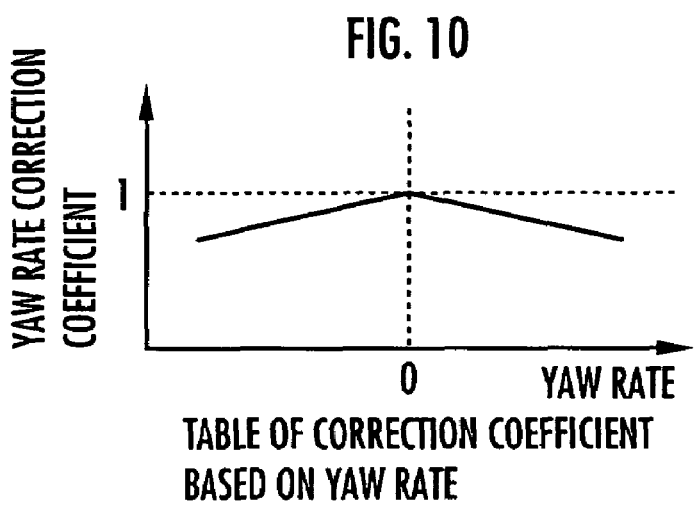
FIG. 10 is a table showing correction coefficients based on yaw rate.

In step S3-6, the corrector 38 corrects the regeneration amount allocation ratio map_dev_rate_R of the rear wheels 5. More specifically, the table shown in FIG. 9 that specifies correction coefficients is searched on the basis of the gradient of a traveling road detected by the gradient sensor 28, and the regeneration amount allocation ratio is corrected using the retrieved correction coefficient. Further, the table shown in FIG. 10 that specifies correction coefficients is searched on the basis of the yaw rate detected by the yaw rate sensor 27, and the regeneration amount allocation ratio map_dev_rate_R of the rear wheels 5 is corrected using the retrieved correction coefficient. The vehicle 1 may be provided with a sensor for detecting a frictional coefficient of a road surface, and the corrector 38 may carry out additional processing for correcting the regeneration amount allocation ratio map_dev_rate_R on the basis of the frictional coefficient of a road surface detected by the sensor.

Next, the processing proceeds to step S3-7 where a determination value is calculated by the determination value calculator 33. In the present embodiment, the value calculated by dividing the yaw rate Yaw detected by the yaw rate sensor 27 that has been read in step S3-4 by the steering angle STRG_ang detected by the steering angle sensor 25 that has been read in step S3-1 (Yaw/STRG_ang) is defined as a determination value Ex_ybys. According to the present embodiment, in calculating the yaw rate/steering angle, if the steering angle STRG_ang detected by the steering angle sensor 25 is in the vicinity of zero (specifically 0.5 deg or less), then the calculation is performed with the steering angle STRG_ang defined as a predetermined value (e.g., 0.5 deg).

Figure 11:
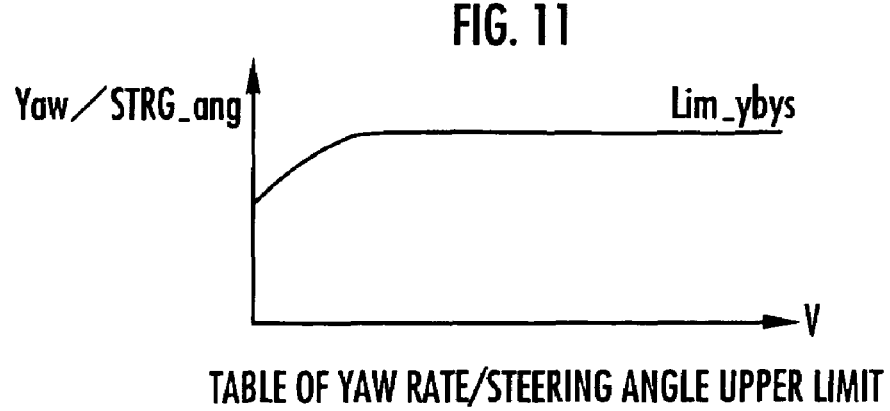
FIG. 11 is a table showing upper limit values of yaw rate/steering angle.

Subsequently, the processing proceeds to step S3-8 wherein the table shown in FIG. 11 that specifies a predetermined range based on the relationship between yaw rate/steering angle and speed is searched to read an upper limit value Lim_ybys of the yaw rate/steering angle corresponding to an actual speed v.

Then, the processing proceeds to step S3-9 wherein the determiner 34 determines whether the determination value Ex_ybys calculated in step S3-7 is below the upper limit value Lim_ybys (within the predetermined range). At this time, if the determination value Ex_ybys is below the upper limit value Lim_ybys, then the selector 35 selects the processing of step S3-10, or if the determination value Ex_ybys is the upper limit value Lim_ybys or more, then the selector 35 selects the processing of step S3-11. The determination value Ex_ybys denotes the behavior of the vehicle 1 while it is traveling (turning). If, for example, the behavior of the vehicle 1 is disturbed by a disturbance of a road surface or the like and a driver is correcting the behavior by performing an operation, such as counter-steering, the determination value Ex_ybys exceeds the upper limit value Lim_ybys. Hence, if the determination value Ex_ybys is below the upper limit value Lim_ybys, then it is determined that the behavior of the vehicle 1 during its traveling (turning) is stable and no behavior correction is being made by the driver, and the processing proceeds to step S3-10 wherein the regeneration allocation ratio map_dev_rate_R of the rear wheels 5 that has been corrected in step S3-6 is stored in ECU 13 as a desired value Obj_dev_rate_R. On the other hand, if the determination value Ex_ybys is the upper limit value Lim_ybys or more, then it is determined that the driver is making a behavior correction, and the processing proceeds to step S3-11 wherein the regeneration allocation ratio of the rear wheels 5 stored in the ECU 13 and used for regeneration control last time (hereinafter abbreviated to "OLD value") Obj_dev_rate_old_R is stored in the ECU 13 as the desired value Obj_dev_rate_R. Further, if the processing proceeds to step S3-12 in the aforesaid step S3-2 or step S3-5, then zero is stored in the ECU 13 as the desired value Obj_dev_rate_R.

Next, the processing proceeds to step S3-13 wherein the desired value Obj_dev_rate_R of the regeneration allocation ratio of the rear wheels 5 stored in one of step S3-10, step S3-11 and step S3-12 is stored as the OLD value Obj_dev_rate_old_R. Subsequently, the processing proceeds to step S3-14 wherein the desired value Obj_dev_rate_R of the regeneration allocation ratio of the rear wheels 5 is stored in the ECU 13 as a command value Cmd_dev_rate_R.

Then, the processing proceeds to step S3-15 wherein a command value Cmd_dev_rate_F of the regeneration allocation ratio of the front wheels 2 is calculated by a 100-Cmd_dev_rate_R from the command value Cmd_dev_rate_R of the regeneration allocation ratio of the rear wheels 5.

Thus, the regeneration amount allocation ratios of the front wheels 2 and the rear wheels 5 are calculated in step S2-1 shown in FIG. 4. Subsequently, the processing of step S2-2 is carried out by the front wheel regeneration command issuer 36, and then the processing of step S2-3 is carried out by the rear wheel regeneration command issuer 37. First, the procedure of step S2-2 will be explained in conjunction with FIG. 6. The command value Cmd_dev_rate_F of the regeneration allocation ratio of the front wheels 2 is read in step S4-1, and then the total regeneration amount determined in step S1-1 is read in step S4-2. Then, the regeneration amount of the front wheels 2 is calculated in step S4-3 from the total regeneration amount and the regeneration allocation ratio of the front wheels 2, which is the command value Cmd_dev_rate_F. In step S4-4, the command of a final regeneration amount obtained by applying a filter (or a restriction on the amount of a change) to the regeneration amount of the rear wheels 5 by the restrainer 39 is issued to the first electric motor 4 through the intermediary of the first PDU 12.

Figure 7:
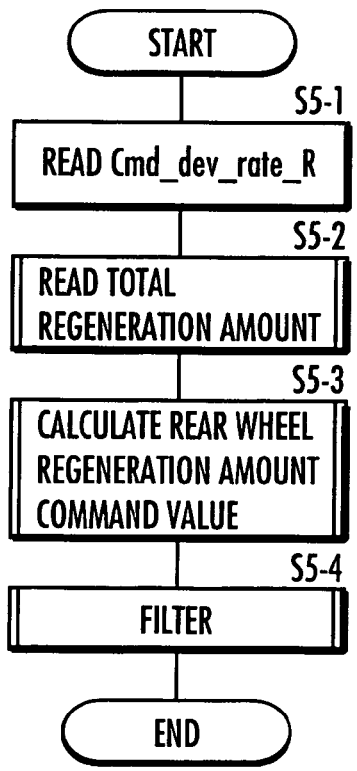
FIG. 7 is a flowchart showing the processing of sending a rear wheel regeneration amount command to a second electric motor.

The procedure of step S2-3 will now be explained in conjunction with FIG. 7. The command value Cmd_dev_rate_R of the regeneration allocation ratio of the rear wheels 5 is read in step S5-1, and then the total regeneration amount determined in step S1-1 is read in step S5-2. Then, the regeneration amount of the rear wheels 5 is calculated in step S5-3 from the total regeneration amount and the regeneration allocation ratio of the rear wheels 5, which is the command value Cmd_dev_rate_R. In step S5-4, the command of a final regeneration amount obtained by applying a filter (or a restriction on the amount of a change) to the regeneration amount of the rear wheels 5 by the restrainer 40 is issued to the second electric motor 6 through the intermediary of the second PDU 19.

Thus, according to the processing from step S3-9 to step S3-15 of FIG. 5, the regeneration allocation ratio (OLD value) of the rear wheels 5 stored in the ECU 13 and used for regeneration control last time is used as the command value when, for example, the behavior of the vehicle 1 is disturbed due to a disturbance of a road surface or the like and a driver is correcting the behavior by countersteering or the like. Hence, when the behavior of the vehicle 1 is disturbed due to a disturbance of a road surface or the like and the driver is correcting the behavior by countersteering, the command value before the behavior of the vehicle 1 was disturbed is applied, and the regeneration amounts specified and sent to the first electric motor 4 and the second electric motor 6 are fixed to the ones before the behavior of the vehicle 1 was disturbed. With this arrangement, when the driver is making a behavior correction by countersteering, a change of the regenerative braking of the front and rear wheels is restrained, thus enabling the driver to accurately know the behavior of the vehicle 1 so as to be able to achieve smooth correction of the behavior.

Figure 12:
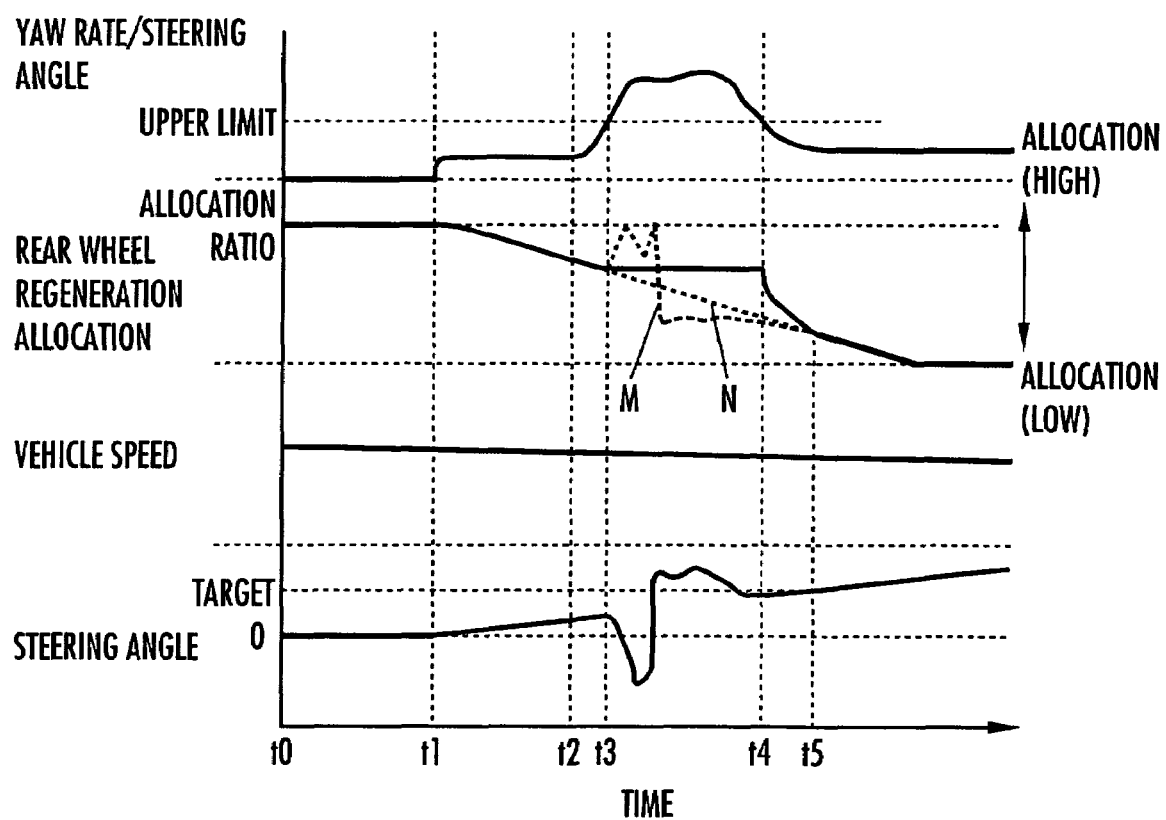
FIG. 12 is a chart showing an operation of the regeneration control system according to the present embodiment.

The operation during regeneration control according to the present embodiment will now be explained with reference to FIG. 12 and FIG. 13. FIG. 12 shows the operation performed when a disturbance occurs while the steering angle is changing, while the vehicle speed is being maintained substantially constant (or slightly decelerating). Referring to FIG. 12, the vehicle 1 is traveling straight from t0 to t1. At t1, steering through the steering wheel 26 is begun to turn. From t1 to t3, the steering angle is gradually increased as the driver steers the vehicle to make the turn. At this time, the regeneration allocation ratio of the rear wheels 5 is gradually decreased by the processing of step S3-10 and after in FIG. 3. Then, a disturbance occurs at t2 immediately before t3 and the behavior of the vehicle 1 starts to be disturbed. This causes the value of yaw rate/steering angle to suddenly increase. At t3, the driver starts the countersteering to make the behavior correction. At this time, it is determined in step S3-7 to step S3-9 shown in FIG. 3 that the value of the yaw rate/steering angle has exceeded an upper limit value, and the processing of step S3-11 and after in FIG. 3 fixes the regeneration allocation ratio of the rear wheels 5 to the regeneration allocation ratio at the point of t3. After that, when the behavior of the vehicle 1 is stabilized at t4 by the behavior correction made by the driver, the system returns to the processing of the S3-10 and after shown in FIG. 3. Furthermore, from t4 to t5, a sudden change in the regeneration allocation ratio is prevented by the processing of step S4-4 of FIG. 6 and step S5-4 of FIG. 7.

During the period from t3 to t4, if no countersteering is performed, and if it is determined in step S3-7 to step S3-9 in FIG. 3 that the value of the yaw rate/steering angle is below an upper limit value, then the regeneration allocation ratio of the rear wheels 5 will be gradually reduced, as indicated by a dashed line N, by the processing of step S3-10 and after in FIG. 3.

During the period from t3 to t4, if the regeneration control according to the present embodiment is not employed, that is, if step S3-11 shown in FIG. 3 is not employed, when a countersteering is performed, then the processing of step S3-10 and after shown in FIG. 3 is continued and the regeneration allocation ratio of the rear wheels 5 significantly changes, as indicated by a broken line M, thus making it difficult for a driver to grasp regenerative braking. According to the present embodiment, when a driver is carrying out countersteering to make a behavior correction, the regeneration allocation ratio of the rear wheels 5 is fixed to the one immediately before the countersteering was begun, so that a smooth behavior correction can be accomplished without interfering with the driver trying to grasp the behavior.

Figure 13:
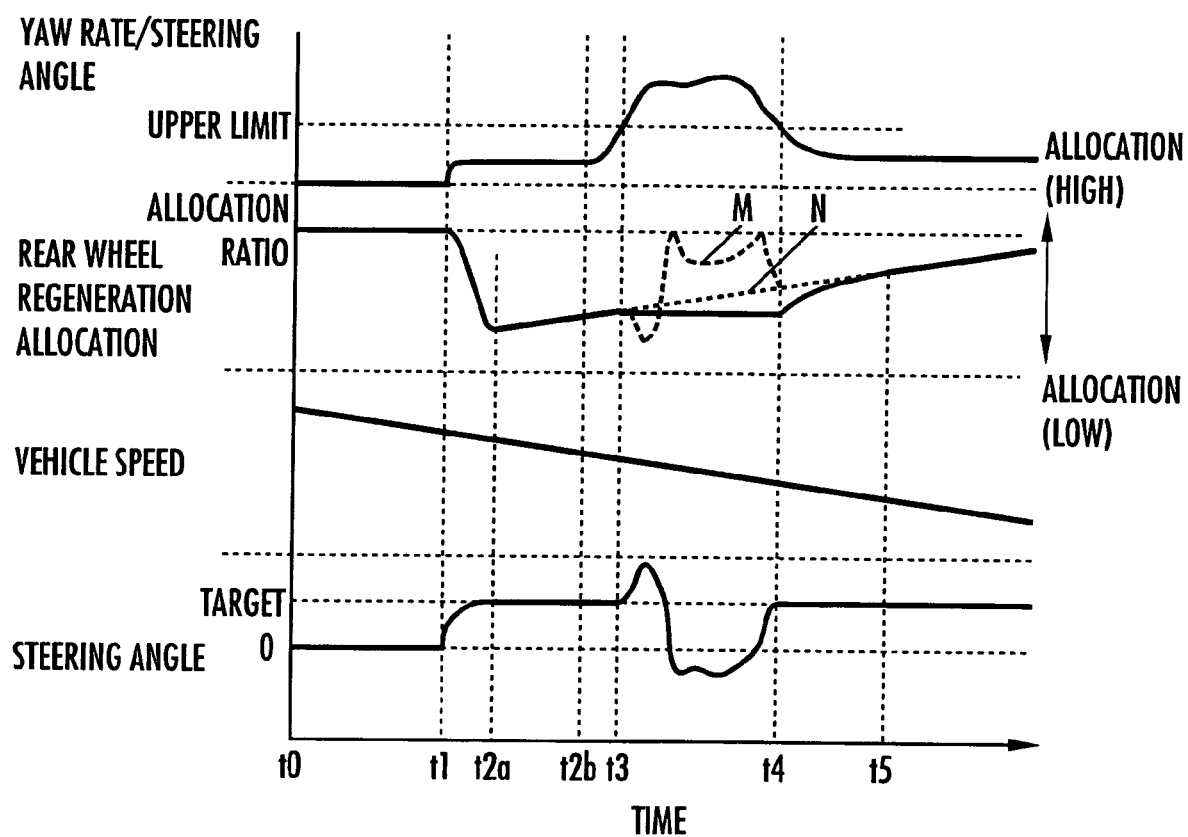
FIG. 13 is another chart showing the operation of the regeneration control system according to the present embodiment.

FIG. 13 shows the operation performed when a disturbance occurs during deceleration when the steering angle is fixed. Referring to FIG. 13, after traveling straight from t0 to t1, the steering of the steering wheel 26 is started at t1 to turn, and the steering angle is gradually increased from t1 to t2a as a driver further steers to turn. At this time, as the steering angle increases, the regeneration allocation ratio of the rear wheels 5 decreases due to the processing of step S3-10 and after in FIG. 3. Thereafter, the steering angle is kept constant from t2b to t3. At this time, as the vehicle slows down, the regeneration allocation ratio of the rear wheels 5 gradually increases due to the processing of step S3-10 and after in FIG. 3.

Then, a disturbance occurs at t2b immediately before t3, causing the behavior of the vehicle 1 to start to be disturbed, and the value of the yaw rate/steering angle suddenly increases. At t3, countersteering is begun by the driver to correct the behavior. At this time, it is determined in step S3-7 to step S3-9 in FIG. 3 that the value of the yaw rate/steering angle has exceeded an upper limit value, and the processing of step S3-11 and after in FIG. 3 fixes the regeneration allocation ratio of the rear wheels 5 at the regeneration allocation ratio at the point of t3. After that, when the driver successfully corrects the behavior to restore stability of the vehicle 1 at t4, the system returns to the processing from step S3-10 and after in FIG. 3. From t4 to t5, the processing of step S4-4 of FIG. 6 and step S5-4 of FIG. 7 prevents a sudden change in a regeneration allocation ratio.

Also in the case illustrated in FIG. 13, according to the present embodiment, while a driver is carrying out countersteering to make a behavior correction, the regeneration allocation ratio of the rear wheels 5 is fixed to the one immediately before the countersteering was begun. This makes it possible to control a marked change in the regeneration allocation ratio of the rear wheels 5, as shown by the dashed line M, enabling the driver to accomplish a smooth behavior correction.

In the present embodiment, the hybrid vehicle 1 has been taken as the example; however, the present invention is not limited thereto. The present invention can be ideally applied also to a four-wheel-drive electric car with no engine, the front wheels thereof being driven by a first motor and the rear wheels being driven by a second motor (not shown).

What is claimed is:

1. A regeneration control system of a vehicle, comprising:
a first electric motor connected to front wheels and a second electric motor connected to rear wheels so as to carry out regeneration by the first and the second electric motors in a deceleration mode;
total regeneration amount determining means for determining a total regeneration amount of the vehicle on the basis of a running condition of the vehicle for a predetermined time interval;
regeneration amount allocation determining means for determining the allocation of a regeneration amount to each of the first and the second electric motors relative to a total regeneration amount on the basis of a vehicle speed and the steering angle of a steering wheel when the total regeneration amount has been determined by the total regeneration amount determining means;
determination value calculating means for calculating a determination value for determining a behavior of the vehicle on the basis of the steering angle of the steering wheel and a yaw rate when the allocation of the regeneration amount has been determined by the regeneration amount allocation determining means;

determining means for determining whether the determination value calculated by the determination value calculating means lies in a predetermined range defined beforehand;

selecting means for selecting, if the determining means determines that the determination value lies in the predetermined range, the allocation of a regeneration amount determined by the regeneration amount allocation determining means at that point, or for selecting, if it is determined that the determination value lies out of the predetermined range, the allocation of a regeneration amount determined by the regeneration amount allocation determining means at the point when the determination value lied in the predetermined range immediately before it deviated from the predetermined range; and regeneration command issuing means for issuing a command of a regeneration amount to each of the first and the second electric motors on the basis of the regeneration amount allocation selected by the selecting means.

2. The regeneration control system according to claim 1, wherein the regeneration amount allocation determining means comprises correcting means for correcting the allocation of a regeneration amount on the basis of a gradient of a traveling road.

3. The regeneration control system according to claim 1, wherein the regeneration amount allocation determining means comprises correcting means for correcting the allocation of a regeneration amount on the basis of a yaw rate.

4. The regeneration control system according to claim 1, wherein the regeneration command issuing means comprises restraining means for restraining a regeneration amount to be specified at a time on the basis of a change in the regeneration amount to be specified at a time relative to the regeneration amount specified immediately before.

* * * * *